United States Patent
Eizadi et al.

(10) Patent No.: US 9,430,295 B1
(45) Date of Patent: Aug. 30, 2016

(54) INTERNET PROTOCOL ADDRESS MANAGEMENT (IPAM) INTEGRATION WITH A PLURALITY OF VIRTUALIZATION TIERS IN THE VIRTUAL CLOUD

(75) Inventors: Soheil Eizadi, Portola Valley, CA (US); Steven Whittle, Redwood City, CA (US); Chuan Wang, San Francisco, CA (US)

(73) Assignee: Infoblox Inc., Santa Clara, CA (US)

( * ) Notice: Subject to any disclaimer, the term of this patent is extended or adjusted under 35 U.S.C. 154(b) by 743 days.

(21) Appl. No.: 13/434,522

(22) Filed: Mar. 29, 2012

(51) Int. Cl.
G06F 9/455 (2006.01)
G06F 9/46 (2006.01)
G06F 9/50 (2006.01)

(52) U.S. Cl.
CPC ......... *G06F 9/5072* (2013.01); *G06F 9/45558* (2013.01); *G06F 9/5027* (2013.01); *G06F 2009/45562* (2013.01); *G06F 2201/815* (2013.01)

(58) Field of Classification Search
USPC ...................................... 718/1, 104; 709/226
See application file for complete search history.

(56) References Cited

U.S. PATENT DOCUMENTS

| | | | |
|---|---|---|---|
| 7,702,639 B2 * | 4/2010 | Stanley et al. | 707/999.1 |
| 2008/0045234 A1 * | 2/2008 | Reed | H04W 8/02 455/456.1 |
| 2010/0070725 A1 * | 3/2010 | Prahlad et al. | 711/162 |
| 2010/0088150 A1 * | 4/2010 | Mazhar et al. | 705/10 |
| 2010/0169948 A1 * | 7/2010 | Budko et al. | 726/1 |
| 2010/0205304 A1 * | 8/2010 | Chaturvedi | H04L 61/2015 709/226 |
| 2011/0099608 A1 * | 4/2011 | Queck et al. | 726/4 |
| 2011/0125894 A1 * | 5/2011 | Anderson et al. | 709/224 |
| 2011/0126197 A1 * | 5/2011 | Larsen et al. | 718/1 |
| 2012/0072640 A1 * | 3/2012 | Crawford | G06F 3/0607 711/103 |
| 2012/0180040 A1 * | 7/2012 | DeLuca et al. | 718/1 |
| 2012/0198073 A1 * | 8/2012 | Srikanth et al. | 709/226 |
| 2012/0260248 A1 * | 10/2012 | Katiyar et al. | 718/1 |
| 2013/0232497 A1 * | 9/2013 | Jalagam et al. | 718/104 |
| 2013/0262685 A1 * | 10/2013 | Shelton et al. | 709/226 |
| 2013/0346899 A1 * | 12/2013 | Cole | G06F 3/0482 715/771 |
| 2014/0082166 A1 * | 3/2014 | Robinson | G06F 9/5072 709/223 |

* cited by examiner

*Primary Examiner* — Abu Ghaffari
(74) *Attorney, Agent, or Firm* — Van Pelt, Yi & James LLP

(57) ABSTRACT

Processing infrastructure metadata information about a virtual resource of a virtual cloud is disclosed. Infrastructure metadata information is collected. The collected metadata information is about a virtual resource of a virtual cloud. A storage of infrastructure metadata information is updated. The updating of the storage of infrastructure metadata information is performed using the collected information.

20 Claims, 11 Drawing Sheets

INTERNET PROTOCOL ADDRESS MANAGEMENT (IPAM) INTEGRATION WITH A PLURALITY OF VIRTUALIZATION TIERS IN THE VIRTUAL CLOUD

BACKGROUND OF THE INVENTION

With advances in cloud computing and virtualization, a system administrator is able to easily add or remove a virtual resource, such as a virtual machine, device or network, as needed to dynamically match computing and networking needs. Because virtualization allows a single physical machine to host a large number of virtual resources, it is not uncommon for a single organization to utilize hundreds of virtual resources. The management of these virtual resources has been traditionally difficult. The "virtual sprawl" of an organization's virtual resources across various users, physical machines and types of networks (e.g., private or housed/managed by other entities or other boundaries) makes information about virtual resources difficult to obtain and manage across an entire "virtual sprawl." For example, it is difficult for a network administrator to know the exact identity and location of a virtual resource in a virtual cloud environment. Additionally, access restrictions are sometimes placed on virtual environments to isolate and protect the security of users sharing a single physical machine that hosts the virtual resources of various users. This makes obtaining information about virtual resources in a virtual environment even more difficult. Therefore there exists a need for a better way to obtain and manage information about virtual resources.

BRIEF DESCRIPTION OF THE DRAWINGS

Various embodiments of the invention are disclosed in the following detailed description and the accompanying drawings.

DETAILED DESCRIPTION

Figure 1:
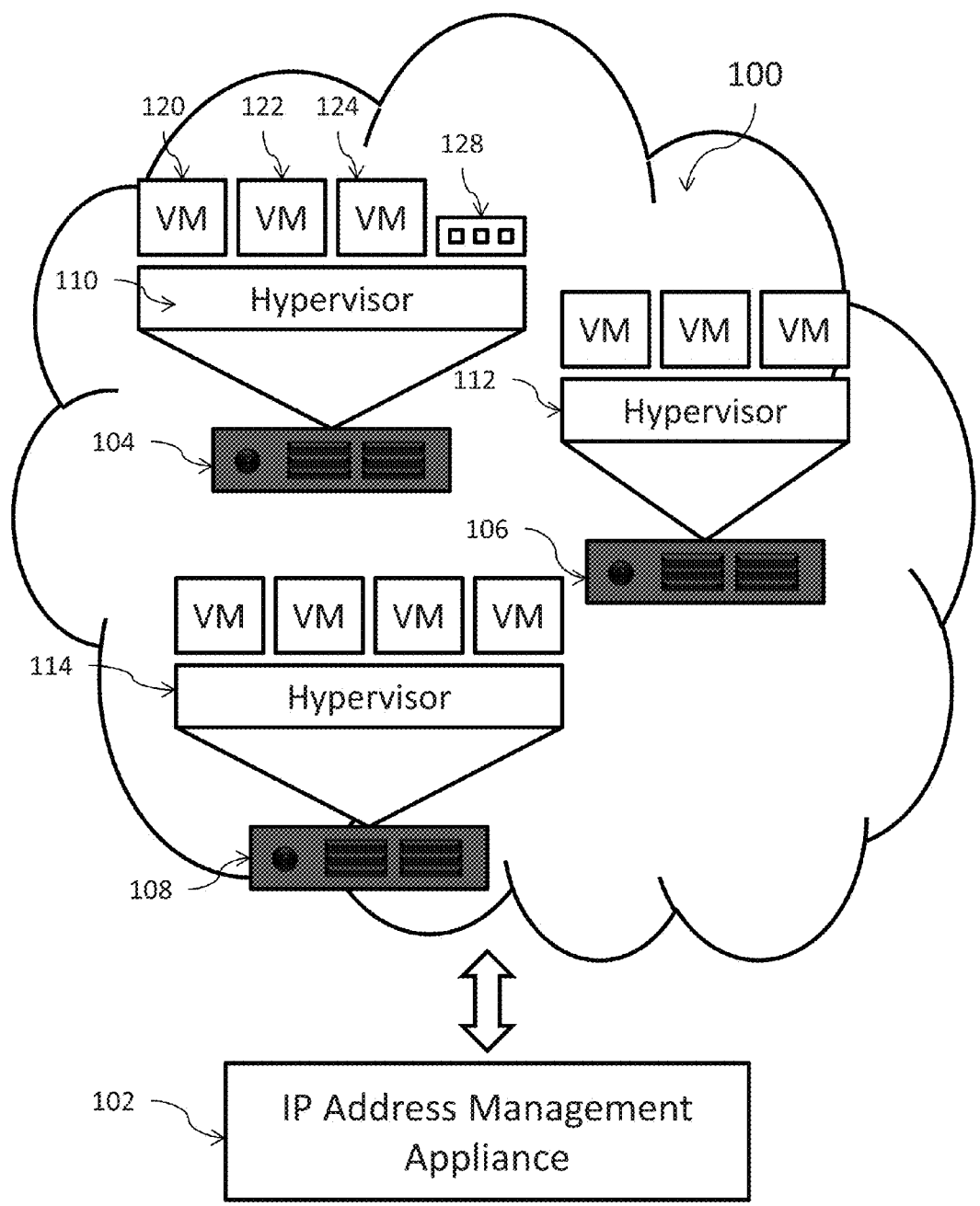
FIG. 1 is a block diagram illustrating an embodiment of a virtual cloud environment.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In an example virtual cloud environment with virtual machines being dynamically created and destroyed, it is desirable to be able to dynamically obtain information about existing virtual machines in the virtual cloud environment to more efficiently manage them. In some embodiments, virtual infrastructure cloud metadata information is collected from the virtual cloud environment. The collected metadata information may be organized and/or outputted (e.g., on a display of a user). For example, the collected metadata information includes identity, location, and attribute information about one or more virtual resources (e.g., a virtual machine, a virtual entity, a virtual device, a virtual network, a virtual switch, a virtual host adaptor, a virtual appliance, or any other element of a virtual cloud) in a virtual cloud environment. In some embodiments, the collected metadata information is organized into hierarchical groupings (e.g., hierarchical folders containing collected metadata information). In some embodiments, the collected metadata information is stored in a storage that includes infrastructure metadata information about both virtual resources and physical resources.

In some embodiments, provisioning an IP address and performing a DNS registration is automatically and programmatically performed for a virtual resource (e.g., a virtual machine, a virtual entity, a virtual device, a virtual network, a virtual switch, a virtual host adaptor, a virtual appliance, or any other element of a virtual cloud). In some embodiments, an Internet Protocol address management (IPAM) appliance manages Internet Protocol (IP) addresses of one or more virtual resources in a virtual cloud environment in addition to managing IP addresses for physical servers and devices. For example, by communicating with the IPAM appliance, an IP address can be automatically obtained, updated, or released for a virtual resource. In some embodiments, DNS registration is automatically managed for one or more virtual resources. For example, a DNS record is automatically updated for a virtual resource, as required.

FIG. 1 is a block diagram illustrating an embodiment of a virtual cloud environment. Virtual cloud 100 is a part of a virtual computing cloud environment and provides virtualized computing services (e.g., providing virtualized computing and networking resources, software, and/or information via a network). In the example shown, virtual cloud 100 includes physical servers 104, 106, and 108 that are interconnected by a network. Servers 104, 106, and 108 execute hypervisor (e.g., a virtual machine manager) 110, 112, and 114, respectively. The hypervisor allows the server to host multiple virtual resources, such as virtual machines. In the example shown, hypervisor 110 running on physical server 104 allows virtual machines 120, 122, and 124 and virtual switch 128 to be hosted on physical server 104. The hypervisor also provides a virtual operating platform that allows different operating system instances and types to run on the physical server hardware. Each virtual machine shown in FIG. 1 is executing a separate instance of an operating system with individual configurations. Examples of hypervisor 110, 112, and 114 include VMware ESX/ESXi™ server and VMware vSphere™ offered by VMware, Inc. of Palo Alto, Calif. Other virtual resources may also be a part of virtual cloud 100, including other virtual switches, virtual host adaptors, virtual appliances, and any other virtual or physical network components, appliances, and devices. The items shown inside virtual cloud 100 are merely examples of any number of same or different types of component may comprise virtual cloud 100.

Internet Protocol Address Management (IPAM) appliance 102 is connected to virtual cloud 100 via a network. An example of IPAM appliance 102 includes an IPAM appliance offered by Infoblox, Inc. of Santa Clara, Calif. IPAM appliance 102 interfaces with cloud 100 to manage one or more resources of virtual cloud 100. For example, IPAM appliance 102 manages the IP addresses and DNS registrations of one or more resources included in virtual cloud 100. In another example, IPAM appliance 102 stores and manages infrastructure metadata information about one or more resources included in cloud 100. For example, IPAM appliance 102 stores configuration, identification, networking, and/or statistical information about a virtual machine included in virtual cloud 100.

In some embodiments, IPAM appliance 102 is a virtual appliance implemented on one or more virtual machines and/or one or more servers included in virtual cloud 100 or a different virtual cloud. In some embodiments, IPAM appliance 100 is a physical server appliance connected to virtual cloud 100 via a network. Examples of the networks discussed in this specification may include one or more of the following: a direct or indirect physical communication connection, mobile communication network, Internet, intranet, Local Area Network, Wide Area Network, Storage Area Network, and any other forms of connecting two or more systems or storage devices together.

Figure 2:
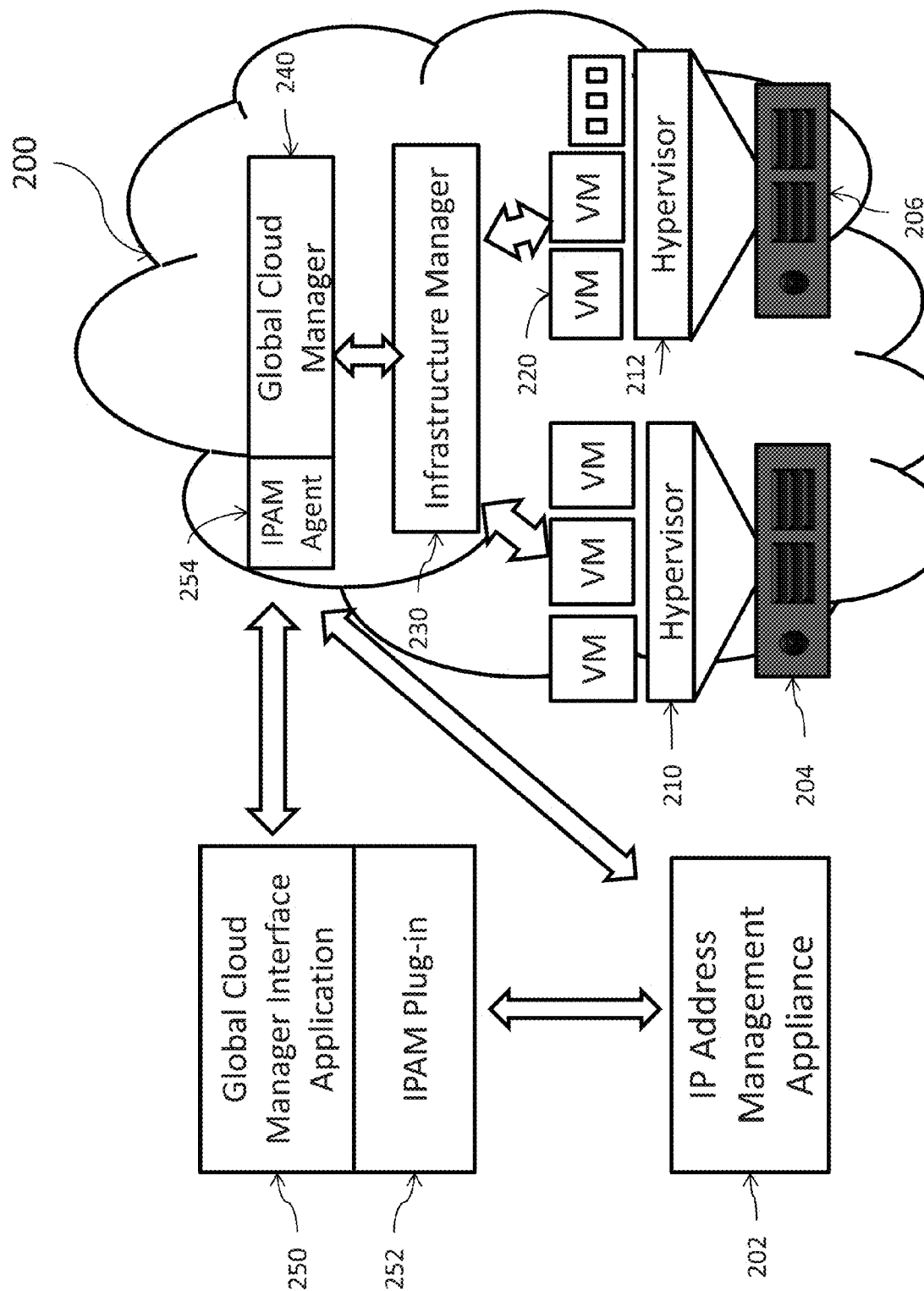
FIG. 2 is a block diagram illustrating an embodiment of a communication interface between an IPAM appliance and a virtual cloud.

FIG. 2 is a block diagram illustrating an embodiment of a communication interface between an IPAM appliance and a virtual cloud. In some embodiments, virtual cloud 200 includes virtual cloud 100 of FIG. 1. Infrastructure manager 230 manages at least hypervisors 210 and 212 that each host one or more virtual machines (e.g., virtual machine 220). An example of an infrastructure manager is vCenter™ Server offered by VMware, Inc. Infrastructure manager 230 also manages virtualized hardware resources (e.g., memory, processors, etc.) of physical servers 204 and 206 that can be shared and allocated to any of the virtual resources hosted by the servers. In some embodiments, infrastructure manager 230 includes and/or is in communication with global cloud manager 240 that manages the applications and/or services provided by virtual cloud 200. Global cloud manager 240 also may manage multiple hypervisors and/or groups of hypervisors. An example of global cloud manager 240 includes vCloud™ Director offered by VMware, Inc.

Global cloud manager interface application 250 interfaces with global cloud manager 240 and can be used to manage virtual cloud 200. For example, a network administrator can use global cloud manager interface application 250 to customize the virtual environment and virtual resources of virtual cloud 100. In some embodiments, global cloud manager interface application 250 communicates with global cloud manager 240 through a standard protocol such as Advanced Message Queuing Protocol (AMQP). In some embodiments, Internet Protocol Address Management plug-in (IPAM plug-in) 252 installed on global cloud manager interface application 250 allows services of IPAM appliance 202 (e.g., management of IP addresses and DNS registration for virtual resources) to be utilized by global cloud manager 240. In some embodiments, IPAM plug-in 252 enables IPAM appliance 202 to interface with global cloud manager interface application 250 through a web service or application programming interface (API).

In some embodiments, IPAM agent 254 is connected with and/or included in global cloud manager 240 and listens to messages communicated to and from global cloud manager 240 to detect information to be passed to IPAM appliance 202. This allows IPAM appliance 202 to interface with global cloud manager 240. In some embodiments, a stand-alone interface application interfaces between global cloud manager interface application 250 and IPAM appliance 202. An example of IPAM appliance 202 includes an IPAM appliance offered by Infoblox, Inc.

In some embodiments, global cloud manager interface application 250 allows a workflow to be defined and/or at least in part processed. The workflow programmatically defines a series of one or more actions to be performed to manage virtual cloud 200. A predefined workflow may be used perform a task that otherwise would require a set of repetitive component actions to be directly used. For example, a network administrator may select a workflow in global cloud manager interface application 250 and execute the workflow that instructs global cloud manager 240 to create a new virtual machine in virtual cloud 200 and automatically obtain an IP address for the new virtual machine using IPAM appliance 202. A workflow may include the use of one or more other workflows, and a plurality of workflows may be used together to accomplish a desired task.

In some embodiments, IPAM plug-in 252 is installed into global cloud manager interface application 250 and provides one or more workflows and/or workflow action components that can be used to define a workflow. These workflows and workflow components may allow IPAM appliance 202 to be used to manage one or more components/resources of virtual cloud 200. For example, IPAM plug-in 252 provides the capability to use a workflow that uses IPAM appliance 202 to automatically assign a determined IP address and perform a DNS registration using the assigned IP address for a virtual machine created in virtual cloud 200.

Figure 3:
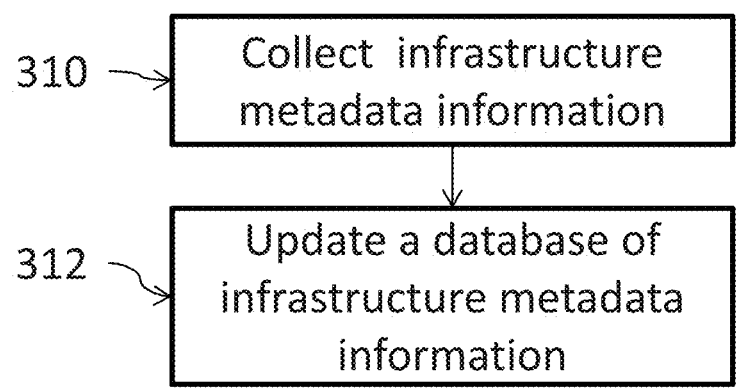
FIG. 3 is a flowchart illustrating an embodiment of a process for collecting infrastructure metadata information.

FIG. 3 is a flowchart illustrating an embodiment of a process for collecting infrastructure metadata information. At least a portion of the process of FIG. 3 may be performed by IPAM appliance 102 of FIG. 1 or 202 of FIG. 2. The infrastructure metadata information may include identifiers, attributes, and configurations associated with a virtual resource of a virtual cloud infrastructure. For example, the infrastructure metadata information includes one or more of the following: a fully qualified domain name, an IP address, a MAC address, an operating system metadata, a virtual data center metadata, an infrastructure manager metadata, a hypervisor metadata, a virtual entity metadata, a virtual cluster metadata, a virtual host metadata, a host server metadata, a virtual switch metadata, a virtual entity type metadata, an extensible attribute, a virtual resource container metadata, an organization metadata, a cloud metadata, a data center metadata, an external network metadata, and any other appropriate metadata. Metadata includes data about data/objects. For example, metadata includes an identifier and/or an attribute. A virtual resource of a virtual cloud, such as virtual cloud 200 of FIG. 2, is associated with a virtual fingerprint. The virtual fingerprint comprises infrastructure metadata information that identifies the virtual resource within a virtual cloud environment. For example, a virtual machine in a virtual cloud is associated with infrastructure metadata information that identifies the virtual machine, such as an IP address, a Media Access Control (MAC) address, an operating system, and a virtual entity name of the virtual machines, as well as identifiers for one or more of the following associated with the virtual machine: a virtual data center, an infrastructure manager, a hypervisor, virtual entity, a virtual cluster, a virtual host, a host server, a virtual switch, a virtual entity type, an extensible, a virtual resource container, an organization, a virtual cloud, a data center, and an external network.

At 310, infrastructure metadata information is collected. In some embodiments, the infrastructure metadata information is collected from a virtual cloud by an IPAM appliance. In some embodiments, infrastructure metadata information is collected at a periodic interval to determine any changes to the infrastructure metadata information. In some embodiments, the infrastructure metadata information is collected at least in part by using an API used to communicate with a virtual cloud. In some embodiments, infrastructure metadata information is dynamically collected as virtual resources of the cloud are dynamically altered. For example, the infrastructure metadata information is collected from a virtual cloud as an initial step before infrastructure metadata information is dynamically collected as virtual resources of the cloud are dynamically altered. In some embodiments, the information is collected using an event generated by a virtual infrastructure (e.g., collected from an AMQP Message).

In some embodiments the information is collected by crawling a virtual cloud to discover virtual resources and its associated infrastructure metadata information. In some embodiments, the metadata information is collected from various virtualization and/or networking tiers of a virtual cloud environment. For example, a first tier metadata information pertaining to a physical layer of the virtual resource (e.g., IP address, MAC address, host operating system) is collected from one or more hypervisors, a second tier metadata information associated with a virtual resource infrastructure tier is collected from an infrastructure manager that manages the virtual resource, and a third tier metadata information associated with a virtual cloud infrastructure tier is obtained from a global cloud manager that manages the infrastructure manager. In the example of a virtual cloud solution offered by VMware, Inc., a Fully Qualified Domain Name, an IP Address, and a MAC address are collected from a physical network tier, metadata associated with vCenter™, virtual Cluster, virtual Host Server, and virtual Switch is collected from a virtual resource infrastructure layer, and metadata associated with vCloud™, vOrganization, vDataCenter, vApp, and virtual machine is collected from the cloud infrastructure layer.

In some embodiments, infrastructure metadata information is collected from a physical network tier associated with hypervisors or physical servers (e.g., server 204, server 206, hypervisor 210, hypervisor 212 of FIG. 2). Information, such as a fully qualified domain name, an IP address and a MAC address, about a virtual resource is collected from the physical network tier. In some embodiments, virtual resource infrastructure tier metadata information is obtained from an infrastructure manager (e.g., infrastructure manager 230 of FIG. 2). A virtual cloud can include several infrastructure managers that each manages one or more hypervisors in the virtual resource infrastructure tier. For example, an infrastructure manager identifier, a cluster identifier, a host server identifier, and a virtual switch identifier are collected from the infrastructure manager. In some embodiments, virtual cloud infrastructure tier metadata information is obtained from a global cloud manager (e.g., global cloud manager 240 of FIG. 2). For example, a cloud identifier, an organization identifier, a data center identifier, and an external network identifier, are collected from the global cloud manager.

In some cases, crawling the cloud to obtain infrastructure metadata information may not be possible or efficient in determining changes to the infrastructure metadata information. In some embodiments, the infrastructure metadata information is collected dynamically as an attribute of a virtual cloud is modified. For example, infrastructure metadata information is collected as a virtual resource of the virtual cloud is created, destroyed, or modified. In some embodiments, an agent in communication with a global cloud manager may detect changes to infrastructure metadata information as an instance of a virtual resource is created, destroyed, or modified. Additionally, when a virtual resource is created, destroyed or modified, an IPAM appliance may be utilized to manage a network attribute (e.g., automatically allocate, de-allocate, modify an IP address) of the virtual resource. This places the IPAM appliance in an opportune position to detect, collect, determine, organize and otherwise process infrastructure metadata information as the virtual resource is created, destroyed or modified. In some embodiments, IPAM plug-in (e.g., IPAM plug-in 252 of FIG. 2) allows the IPAM appliance to communicate with a virtual cloud and provides the IPAM appliance with infrastructure metadata information. In some embodiments, the infrastructure metadata information is collected when a service is provided by an IPAM appliance (e.g., IPAM appliance 202 of FIG. 2) to the virtual cloud. For example, infrastructure metadata information about a virtual resource is collected when the IPAM appliance is used to provision an IP address for the virtual resource.

At 312, the collected infrastructure metadata information is used to update a database of the metadata information. In some embodiments, the collected metadata information is received and used to update the database of infrastructure metadata information. In some embodiments, an IPAM appliance manages the database of infrastructure metadata information. For example, an IPAM appliance includes the database and/or is connected to the database. The database may include information associated with virtual resources as well as physical resources. For example, the database includes a database entry for each virtual resource in a virtual cloud as well as entries for physical resources managed by an IPAM appliance (e.g., physical clients and servers that have their IP addresses managed by the IPAM appliance).

Collected infrastructure metadata information may be tied to an end point record in a database. End point records comprise records in the database about each virtual resource in a virtual cloud. In some embodiments, infrastructure metadata information may be used to organize a group of virtual machines under a virtual data center. The virtual data center is included in a group of virtual data centers organized under a single organization name. The database of infrastructure metadata may be organized, sorted, and/or searched as desired. In some embodiments, information included in the database of infrastructure metadata is displayed in a text, a chart, and/or a graphical form. In some embodiments, information included in the database of infrastructure metadata is used to generate a report.

Figure 4:
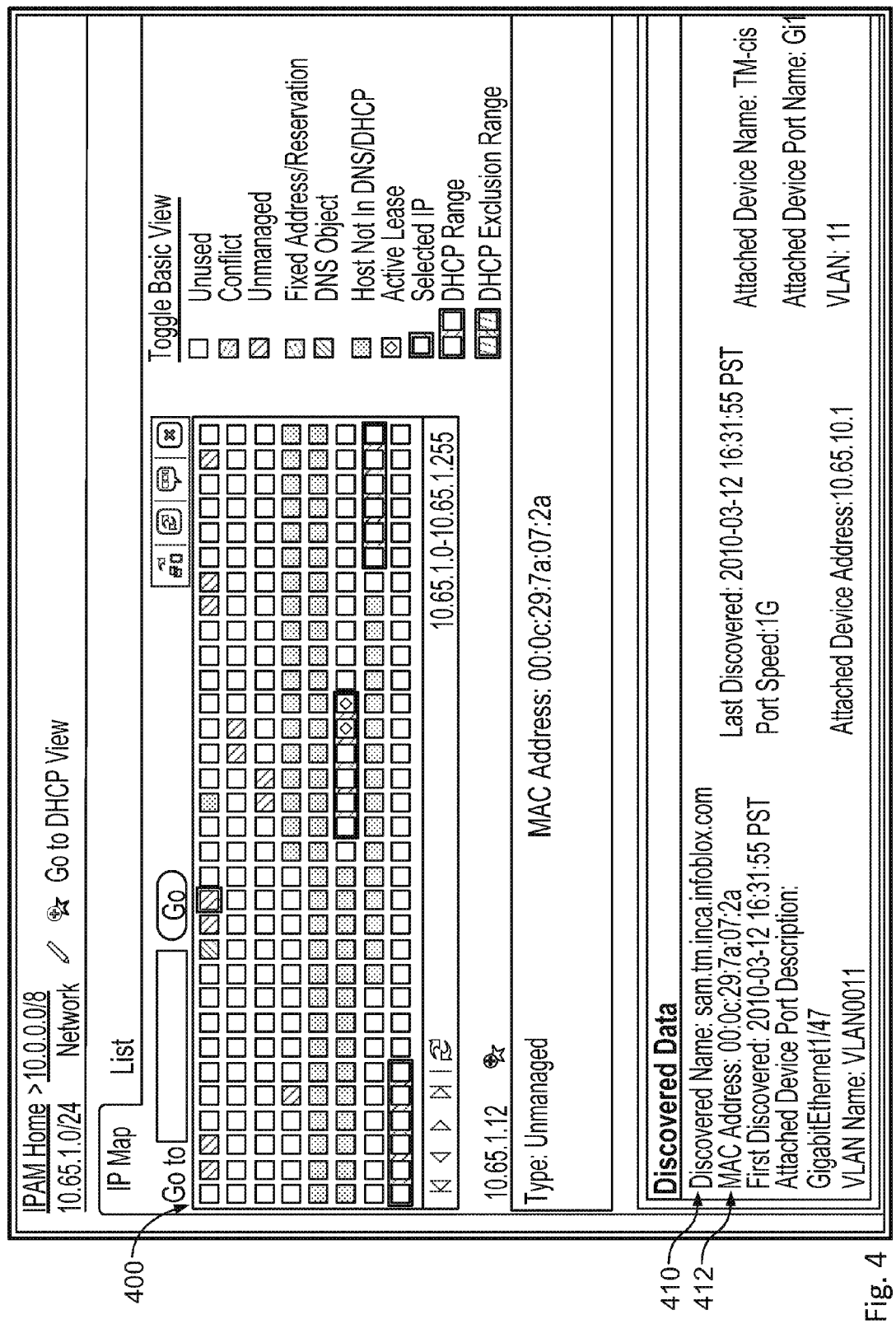
FIG. 4 is a diagram illustrating an example of a graphical interface displaying infrastructure metadata information in a graphical format.

FIG. 4 is a diagram illustrating an example of a graphical interface displaying infrastructure metadata information in a graphical format. In some embodiments, information displayed in FIG. 4 includes information collected in step 310 and/or stored in the database of step 312 of FIG. 3. In the example shown, diagram 400 includes boxes representing a range of IP address from 10.65.1.0-10.65.1.255. If a resource has been allocated one or more of the IP addresses in the range, the resource is represented by a colored box. In some embodiments, a first colored box indicates a virtual resource that has been allocated to a first corresponding IP address and a second colored box indicates a physical resource that has been allocated a second corresponding IP address, thereby allowing virtual machines to be displayed alongside the physical servers. In some embodiments, different colors or shaded patterns may represent different states and attributes of resources allocated to an IP address. Other indications of differences can be used including different borders, colors, fill patterns, etc. to indicate different types of resources, different states or different attributes of a virtual cloud. On the right side of the shown display, a legend defining the different indications and representations of boxes included in 400 is provided. In some embodiments, by hovering and/or selecting one of the boxes in 400, additional infrastructure metadata information associated with the resource represented by the box is displayed. On the bottom of the shown display, additional infrastructure metadata information associated with a resource indicated by a selected box of 400 is displayed. For example, discovered name 410 and MAC address 412 are provided. In some embodiments, the graphical interface of FIG. 4 is accessible via a web browser.

Figure 5:
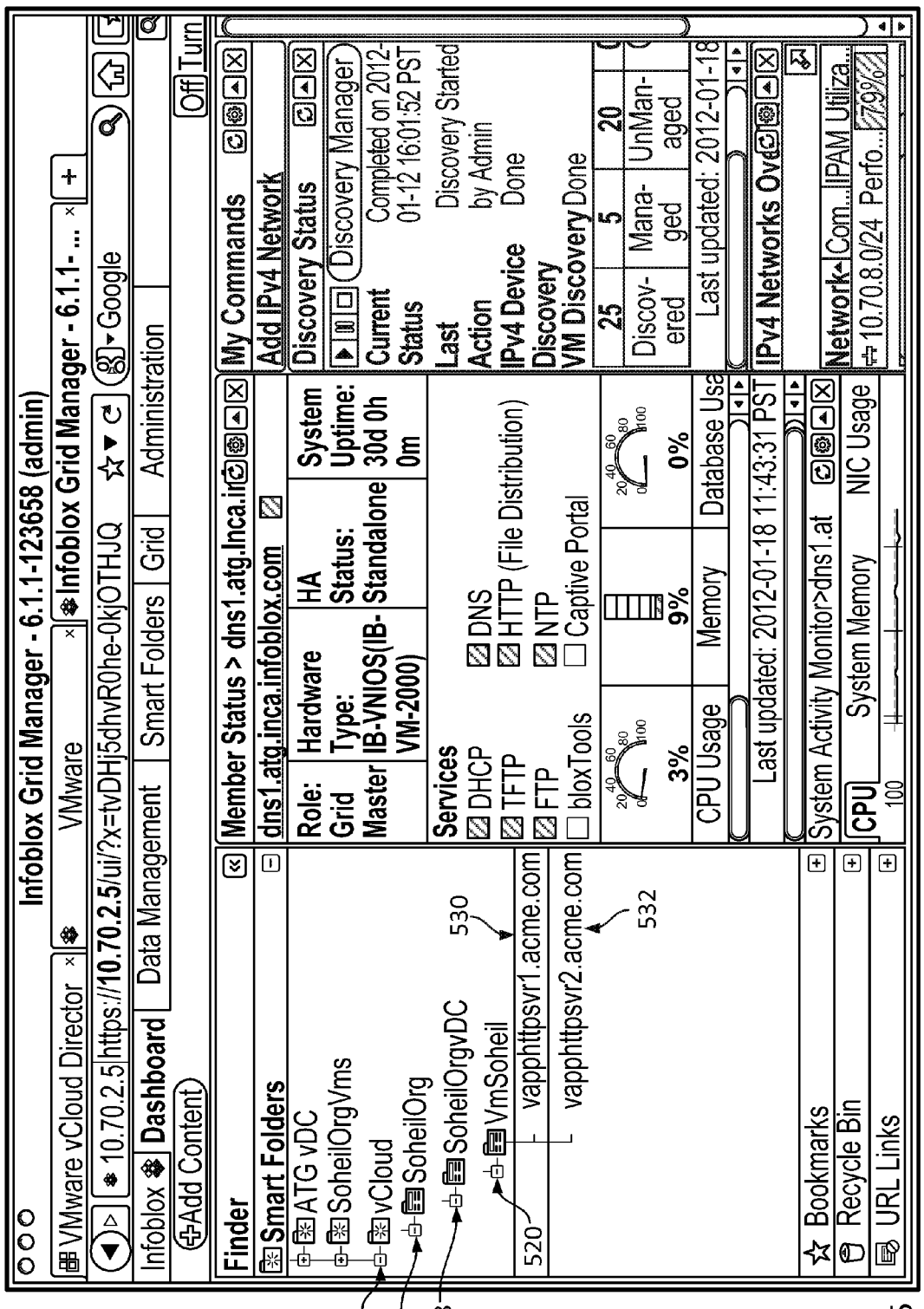
FIG. 5 is a diagram illustrating an example of a graphical interface displaying infrastructure metadata information organized in a hierarchical folder format.

FIG. 5 is a diagram illustrating an example of a graphical interface displaying infrastructure metadata information organized in a hierarchical folder format. In some embodiments, the graphical interface of FIG. 5 is accessible via a web browser. In the example shown, graphical representation of infrastructure metadata information including cloud name, organization name, data center name, cluster name, virtual machine system name, and virtual resource container name is provided in hierarchical folders. Folder 514 represents a virtual cloud named "vCloud." Sub folder 516 represents an organization/user named "SoheilOrg" utilizing the virtual cloud "vCloud." Sub folder 518 represents a virtual data center named "SoheilOrgvDC" that is a part of "SoheilOrg." Sub folder 520 represents a virtual machine named "VmSoheil" that is hosted by "SoheilOrgvDC." Items 530 and 532 represent virtual resource container (e.g., VMware® vApp) instances running on "VmSoheil." By selecting any of the folders and items discussed above, infrastructure metadata information associated with the selection is displayed. Other groupings or hierarchical organization of infrastructure metadata information may be displayed using folders. In some embodiments, folders are used to group and display the virtual resources grouped by switch-ports and/or virtual local area networks.

Figure 6:
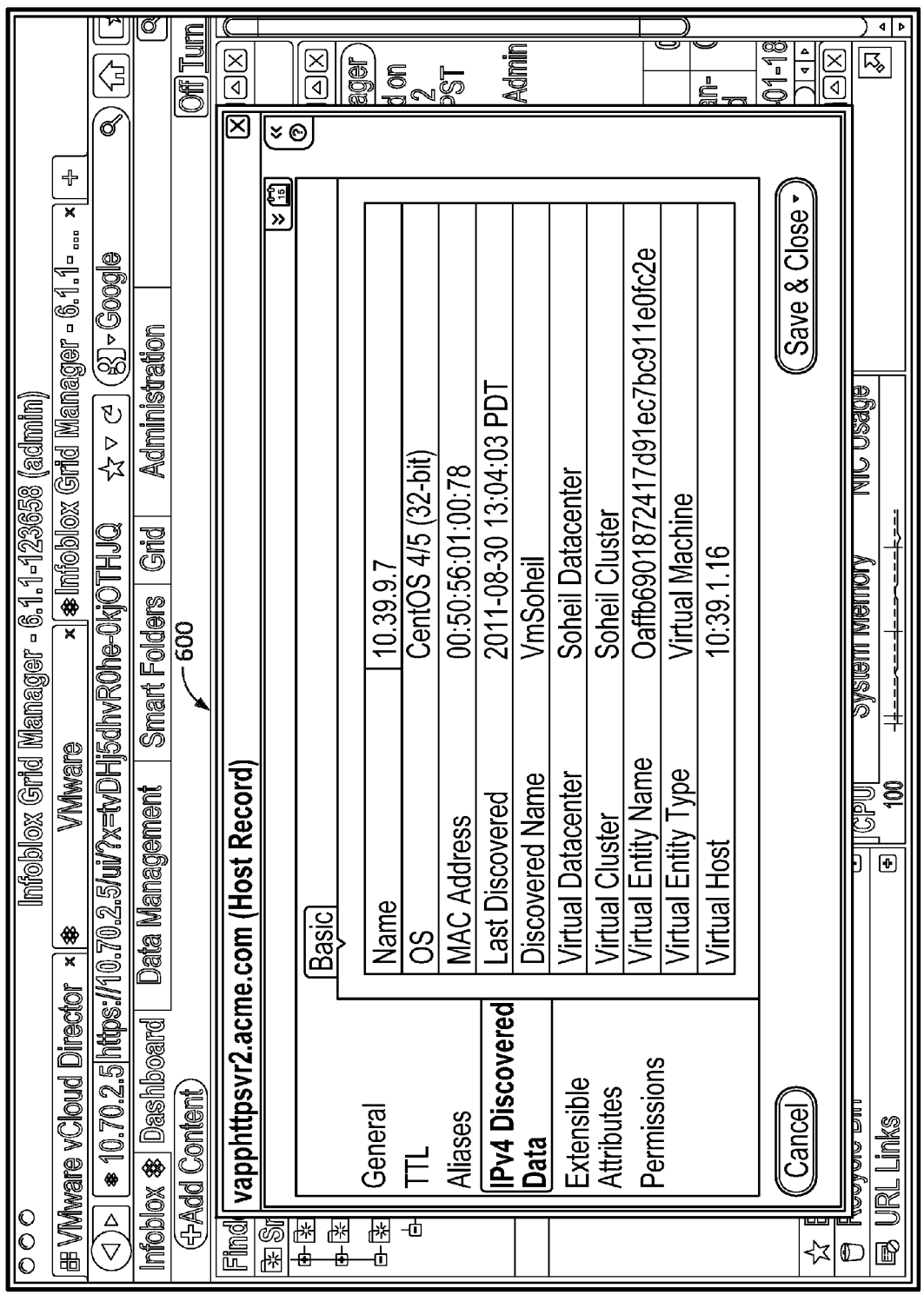
FIG. 6 is a diagram illustrating an example of a graphical interface displaying infrastructure metadata information associated with a virtual resource.

FIG. 6 is a diagram illustrating an example of a graphical interface displaying infrastructure metadata information associated with a virtual resource. In some embodiments, the graphical interface of FIG. 6 is accessible via a web browser. In the example shown, pop-up window 600 displays infrastructure metadata information of a selected virtual resource. The displayed infrastructure metadata information includes a type and build of the operating system, a MAC address, a last discovered time and/or date, a discovered name, a virtual datacenter name, a virtual cluster, a virtual entity name, a virtual entity type, and a virtual host.

Figure 7:
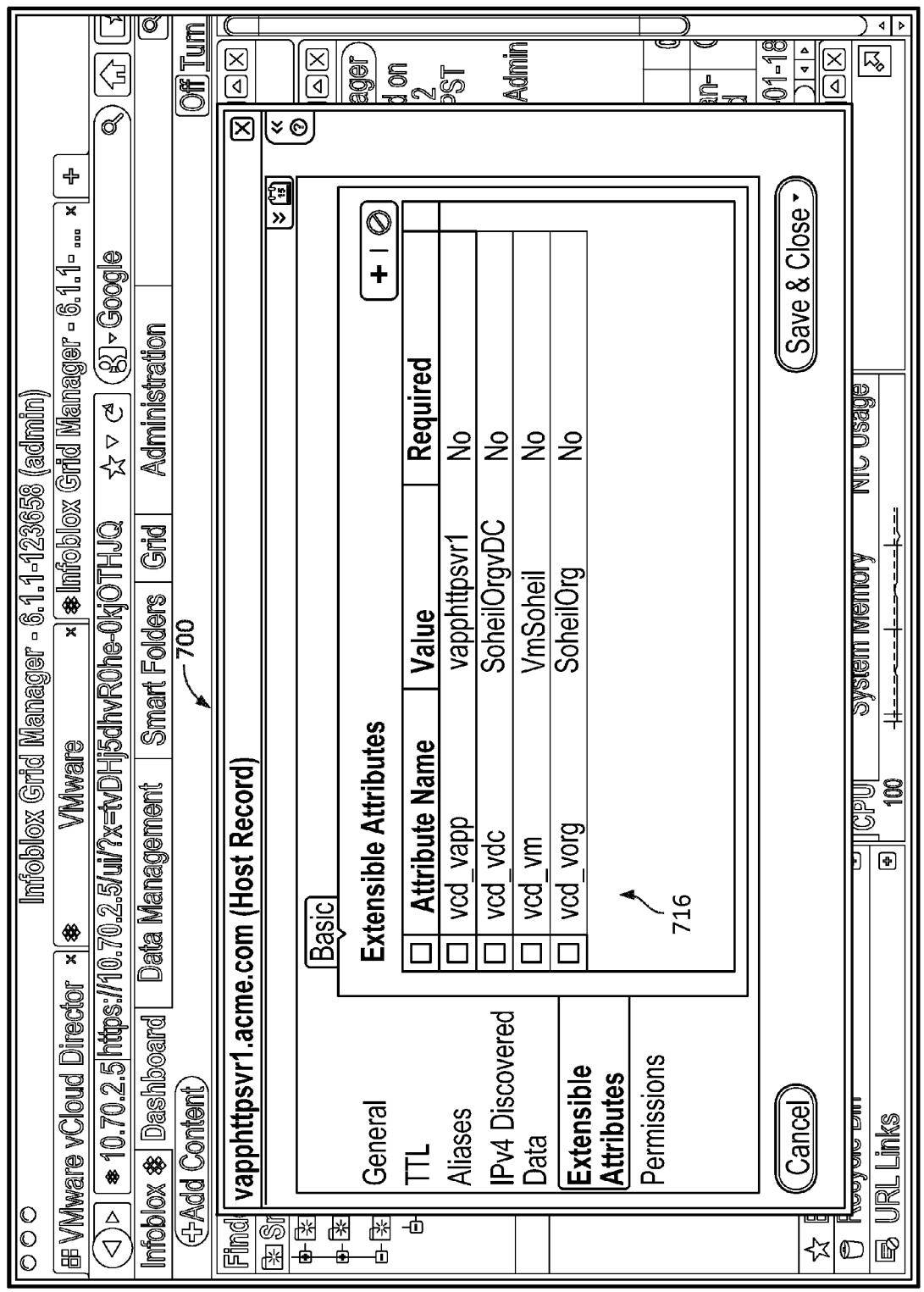
FIG. 7 is a diagram illustrating an example of a graphical interface displaying extensible attributes associated with a virtual resource.

FIG. 7 is a diagram illustrating an example of a graphical interface displaying extensible attributes associated with a virtual resource. In some embodiments, the graphical interface of FIG. 7 is accessible via a web browser. In the example shown, pop-up window 700 displays extensible attributes of a selected virtual resource. The extensible attributes are a group of metadata information related to a virtual resource. Extensible attributes include fields that can be used to define additional properties of a virtual resource that may be predefined and/or user defined. Information of the extensible attributes is not necessarily collected from a virtual cloud. For example, the name of an organization can be stored with an extensible attribute 716 named "vcd vorg" that is assigned a value "SoheilOrg." Extensible attribute 716 identifies the owner organization (e.g., company/user) of a virtual resource. By providing additional fields, extensible attributes further facilitate description and mapping of virtual resources to a unique and descriptive identity in the virtual cloud. One or more extensible attributes may be stored or associated with infrastructure metadata information of a virtual resource.

Figure 8:
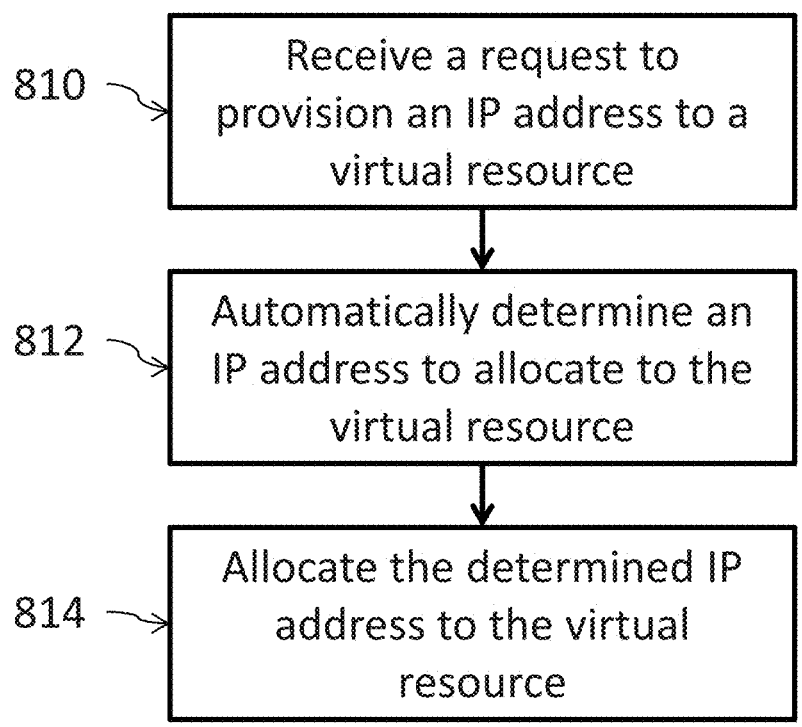
FIG. 8 is a flowchart illustrating an embodiment of a process for automatically provisioning a virtual resource with an IP address.

FIG. 8 is a flowchart illustrating an embodiment of a process for automatically provisioning a virtual resource with an IP address. At least a portion of the process of FIG. 8 may be implemented on IPAM appliance 102 of FIGS. 1 and/or 202 of FIG. 2. In some embodiments, provisioning an IP address to a virtual resource includes reserving an IP address to prevent the IP address from being assigned to another resource. The IP address may be an IPv4 or IPv6 IP address. The process of FIG. 8 may be used to provision an IP address to a variety of virtual resources including a virtual machine, a virtual entity, a virtual device, a virtual network, a virtual switch, a virtual host adaptor, and a virtual appliance. In some embodiments, an IPAM appliance keeps track of the available IP addresses in the virtual cloud environment and determines available IP addresses to be provisioned to virtual resources. In some embodiments, infrastructure metadata collected in 310 of FIG. 3 is used to determine one or more available IP addresses.

At 810, a request is received to provision an IP address to a virtual resource. The request may include information identifying the virtual resource to be assigned an IP address. For example, the request includes a MAC address and/or a Fully Qualified Domain name (FQDN). In some embodiments, the request is received from a global cloud manager (e.g., global cloud manager 240 of FIG. 2) using an IPAM agent (e.g., IPAM agent 254 of FIG. 2). In some embodiments, the request is received due to a workflow defined and/or processed by a global cloud manager interface application. For example, due to the workflow, global cloud manager interface application 250 uses IPAM plug-in 252 to request an IP address from IPAM appliance 202 of FIG. 2. In some embodiments, the received request includes a request to provision an IP address in a provided range of IP addresses.

At 812, an IP address to allocate to the virtual resource is automatically determined. The determined IP address is an available IP address in a network. In some embodiments, IPAM appliance 202 in FIG. 2 automatically determines the IP address. In some embodiments, determining the IP address includes automatically determining an available IP address (e.g., first available IP address) using a record of assigned and/or available IP addresses of a network. The record of available IP addresses may be stored in a database of an IPAM appliance or elsewhere that is accessible by the IPAM appliance via a network or other communication connection. In some embodiments, determining the IP address includes determining an available IP address (e.g., first available IP address) from a provided range of IP addresses. For example, a starting address and an ending address are provided by the user to designate a range of IP addresses that can be automatically provisioned to a virtual resource. In some embodiments, the IP address is automatically determined due to a workflow defined and/or processed by a global cloud manager interface application. In some embodiments, the process of FIG. 2 is included in step 812. For example, the determined IP address is collected and used to update a database of infrastructure metadata associated with the virtual resource to be assigned the IP address.

At 814, the determined IP address is allocated to the virtual resource. In some embodiments, allocating the IP address includes assigning the IP address to the virtual resource and appropriately updating a record of available IP addresses. A database of infrastructure metadata information (e.g., host records) may also be updated to associate the virtual resource with the determined IP address. In some embodiments, allocating the IP address includes providing the IP address. For example, IPAM appliance 202 provides the IP address to global cloud manager interface application 250 using IPAM plug-in 252 or to global cloud manager 240 using IPAM agent 254 of FIG. 2. In some embodiments, the determined IP address is provided to a virtual machine before it is run to allow the virtual machine to utilize the IP address to identify the virtual machine. For example, an IPAM appliance sends a message to the global cloud manager to assign or inject the determined IP address to the virtual resource. In another example, the IPAM appliance sends a message with the determined IP Address to the global cloud manager interface application using the IPAM plug-in that sends another message to the global cloud manager to assign or inject the IP address into the virtual resource.

Figure 9:
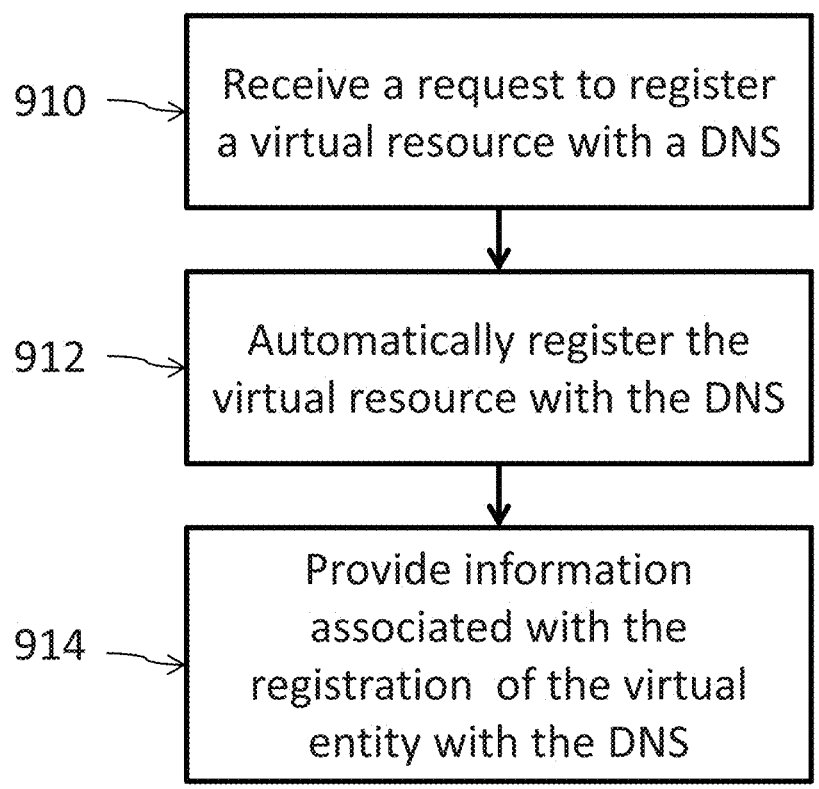
FIG. 9 is a flowchart illustrating an embodiment of a process for registering a virtual resource with a DNS.

FIG. 9 is a flowchart illustrating an embodiment of a process for registering a virtual resource with a DNS. At least a portion of the process of FIG. 9 may be implemented on IPAM appliance 102 of FIGS. 1 and/or 202 of FIG. 2. DNS is used to associate an IP address with a domain name. In some embodiments, the domain name is a FQDN that is unique in a network or virtual cloud environment. The process of FIG. 9 may be used to perform DNS registration for a variety of virtual resources including a virtual machine, a virtual switch, a virtual device, a virtual network, a virtual entity, a virtual host adaptor, and a virtual appliance. In some embodiments, an IPAM appliance keeps track of the available domain names in a virtual cloud environment and determines available domain names to be assigned to virtual resources. In some embodiments, infrastructure metadata collected in 310 of FIG. 3 is used to determine one or more available domain names.

At 910, a request is received to register a virtual resource with a DNS. In some embodiments, this request is received in conjunction with or is the same request as the request for an IP address received at 810 of FIG. 8. In some embodiments, the request includes a desired domain name, such as a FQDN. In some embodiments, the request is received from a global cloud manager (e.g., global cloud manager 240 of FIG. 2) using an IPAM agent (e.g., IPAM agent 254 of FIG. 2). In some embodiments, the request is received due to a workflow defined and/or processed by a global cloud manager interface application. For example, due to the workflow, global cloud manager interface application 250 uses IPAM plug-in 252 to request IPAM appliance 202 of FIG. 2 to register a virtual resource with a DNS. In some embodiments, the request includes an IP address of the virtual resource.

At 912, the virtual resource is automatically registered with the DNS. Registering with the DNS includes associating a domain name with the IP address of the virtual resource. In some embodiments, registering with the DNS includes creating or updating a DNS record of an IPAM appliance and/or a Domain Name Server to associate a domain name of the virtual resource with the IP address of the virtual resource. In some embodiments, registering with the DNS includes determining an available domain name and assigning the available domain to the virtual resource. In some embodiments, the virtual resource is automatically registered with the DNS when an available IP address for the virtual resource is determined at 812 of FIG. 8. In some embodiments, the virtual resource is automatically registered with the DNS due to a workflow defined and/or processed by a global cloud manager interface application. In some embodiments, the process of FIG. 2 is included in step 912. For example, a domain of the virtual resource is collected and used to update a database of infrastructure metadata associated with the virtual resource. In some embodiments, registering with the DNS includes appropriately updating a record of available domain names. A database of infrastructure metadata information (e.g., host records) may also be updated to associate the virtual resource with its domain name.

At 914, information associated with the registration of the virtual resource with the DNS is provided. In some embodiments, providing the associated information of the DNS registration includes providing information to update infrastructure metadata information. In some embodiments, providing the associated information of the DNS registration includes providing a confirmation if the DNS registration was successful and providing an error indication if the registration was not successful. In some embodiments, providing the associated information of the DNS registration includes providing the registered domain name of the virtual resource. For example, IPAM appliance 202 provides the domain name to global cloud manager interface application 250 using IPAM plug-in 252 or to global cloud manager 240 using IPAM agent 254 of FIG. 2. In some embodiments, the domain name is provided to a virtual machine before it is run to allow the virtual machine to utilize the domain name to identify the virtual machine.

Figure 10:
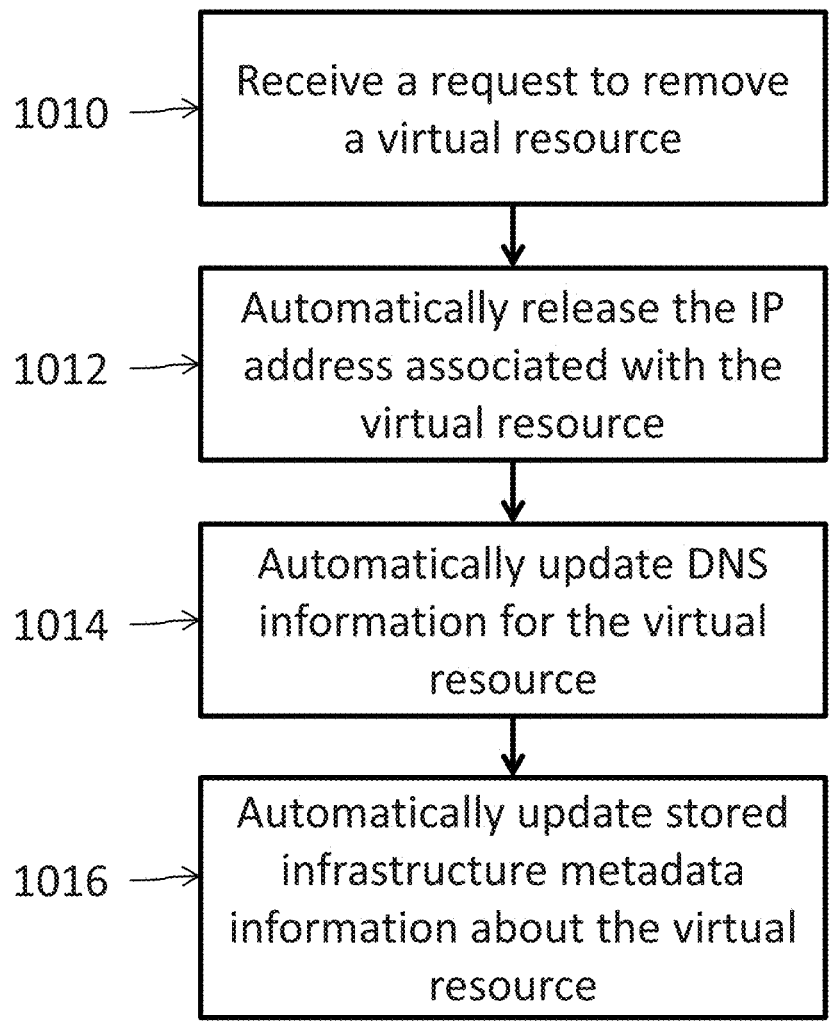
FIG. 10 is a flowchart illustrating an embodiment of a process for removing a virtual resource.

FIG. 10 is a flowchart illustrating an embodiment of a process for removing a virtual resource. At least a portion of the process of FIG. 10 may be implemented on IPAM appliance 102 of FIGS. 1 and/or 202 of FIG. 2. In some embodiments, removing a virtual resource includes deactivating a virtual resource from a virtual cloud environment and releasing one or more resources (e.g., IP address and domain name) of the virtual resource for use by others. In some embodiments, a user initiates removal of a virtual resource from global cloud manager interface application and the request is sent to an IPAM appliance to manage the removal of the virtual resource. In some embodiments, the virtual resource is removed by global cloud manager and a request is sent to the IPAM appliance that a virtual resource is being removed. Then the IPAM appliance receives the request and will accordingly execute steps to manage the removal of a virtual resource. The process of FIG. 10 may be used to remove a variety of virtual resources including a virtual machine, a virtual switch, a virtual entity, a virtual device, a virtual network, a virtual host adaptor, and a virtual appliance. In some embodiments, an IPAM appliance keeps track of resources used by the virtual resource to be removed. In some embodiments, infrastructure metadata collected in 310 of FIG. 3 is used to determine one or more resources to be released.

At 1010, a request is received to remove a virtual resource. The request may include information identifying the virtual resource to be removed. For example, the request includes an IP address, MAC address and/or a Fully Qualified Domain name (FQDN). In some embodiments, the request is received from a global cloud manager (e.g., global cloud manager 240 of FIG. 2) using an IPAM agent (e.g., IPAM agent 254 of FIG. 2). In some embodiments, the request is received due to a workflow defined and/or processed by a global cloud manager interface application. For example, due to the workflow, global cloud manager interface application 250 uses IPAM plug-in 252 to request IPAM appliance 202 of FIG. 2 to free an IP address and a domain name of the virtual resource to be removed.

At 1012, an IP address associated with the virtual resource is automatically released. Releasing the IP address associated with the virtual resource includes freeing the IP address of the virtual resource so that it is available to be assigned to another physical or virtual resource. In some embodiments, IPAM appliance 202 in FIG. 2 automatically releases the IP address. In some embodiments, releasing the IP address includes determining the IP address of the virtual resource using a record of assigned IP addresses of a network. In some embodiments, releasing the IP address includes removing, updating, and/or freeing an IP address record of the virtual resource to be removed. The IP address record may be stored in a database of an IPAM appliance or elsewhere that is accessible by the IPAM appliance via a network or other communication connection. In some embodiments, the IP address is automatically removed due to a workflow defined and/or processed by a global cloud manager interface application.

At 1014, DNS information for the virtual resource is automatically updated. In some embodiments, updating the DNS information includes disassociating the IP address of the virtual resource with the domain name of the virtual resource. In some embodiments, updating the DNS includes information removing or updating a DNS record of an IPAM appliance and/or a Domain Name Server to free the domain name of the virtual resource by disassociating the IP address with the domain name. For example, a message is sent to a Domain Name Server to remove or de-register the virtual resource from the DNS records. In some embodiments, the DNS information for the virtual resource is automatically updated due to a workflow defined and/or processed by a global cloud manager interface application.

At 1016, stored infrastructure metadata information about the virtual resource is automatically updated. In some embodiments, updating the infrastructure metadata information includes updating the database of 312 of FIG. 3. For example, at least a portion of infrastructure metadata information (e.g., IP address and domain name information) about the virtual resource is deleted and/or updated. In some embodiments, updating the stored infrastructure metadata information includes updating or deleting portions of information collected in 310 of FIG. 3. In some embodiments, updating the infrastructure metadata information includes updating a list of available IP addresses and/or domain names for a virtual cloud environment. In some embodiments, a workflow is used to automatically and programmatically manage allocation/management of IP address and DNS registration. The workflows allow grouping and combining of tasks to automate management of a virtual cloud environment. Workflows may be used to automate managing the virtual cloud environment.

In some embodiments, a global cloud manager interface application includes predefined and customizable workflows that provide a user friendly interface for managing a virtual cloud environment. In some embodiments, an IPAM plug-in (e.g., IPAM plug-in 252 of FIG. 2) provides IP address and DNS management functionality to the workflows and functions already included in a global cloud manager interface application. In some embodiments, the IPAM plug-in includes pre-determined workflows, such as workflows that perform the following functionality: reserve an IP address, reserve an IP address in a range, remove a virtual machine, create a VMware® vApp configured by an IPAM appliance, and destroy a VMware® vApp in IPAM appliance records. IPAM plug-in provides an interface with an IPAM appliance that provides these functions.

Actions are components that make up a workflow and represent individual sub-tasks executed to manage the virtual cloud environment. In some embodiments, actions are implemented as JavaScript™ segments that use an API provided by an IPAM plug-in to interface with an IPAM appliance. Examples of IPAM plug-in provided actions that can be used in an existing workflow or used to create a new workflow include the following: add virtual machine, add virtual machine in a range of IP addresses, connect to IPAM appliance, get next available IP address, get next available IP address from range, remove virtual machine, restart IPAM services, update virtual machine MAC address, validate IP address, add virtual machine to DNS, delete virtual machine to DNS, and update virtual machine to DNS. In some embodiments, in order for an IPAM appliance to connect with a global cloud manager interface application, the IPAM plug-in provides an action for connecting to an IPAM appliance. In some embodiments, connecting to an IPAM appliance includes providing a username and a password to authenticate the user's authorization to use or configure IPAM appliance services. In some embodiments, the IPAM plug-in provides actions to control the IPAM appliance from the global cloud manager interface application, including the ability to restart IPAM appliance services.

Figure 11:
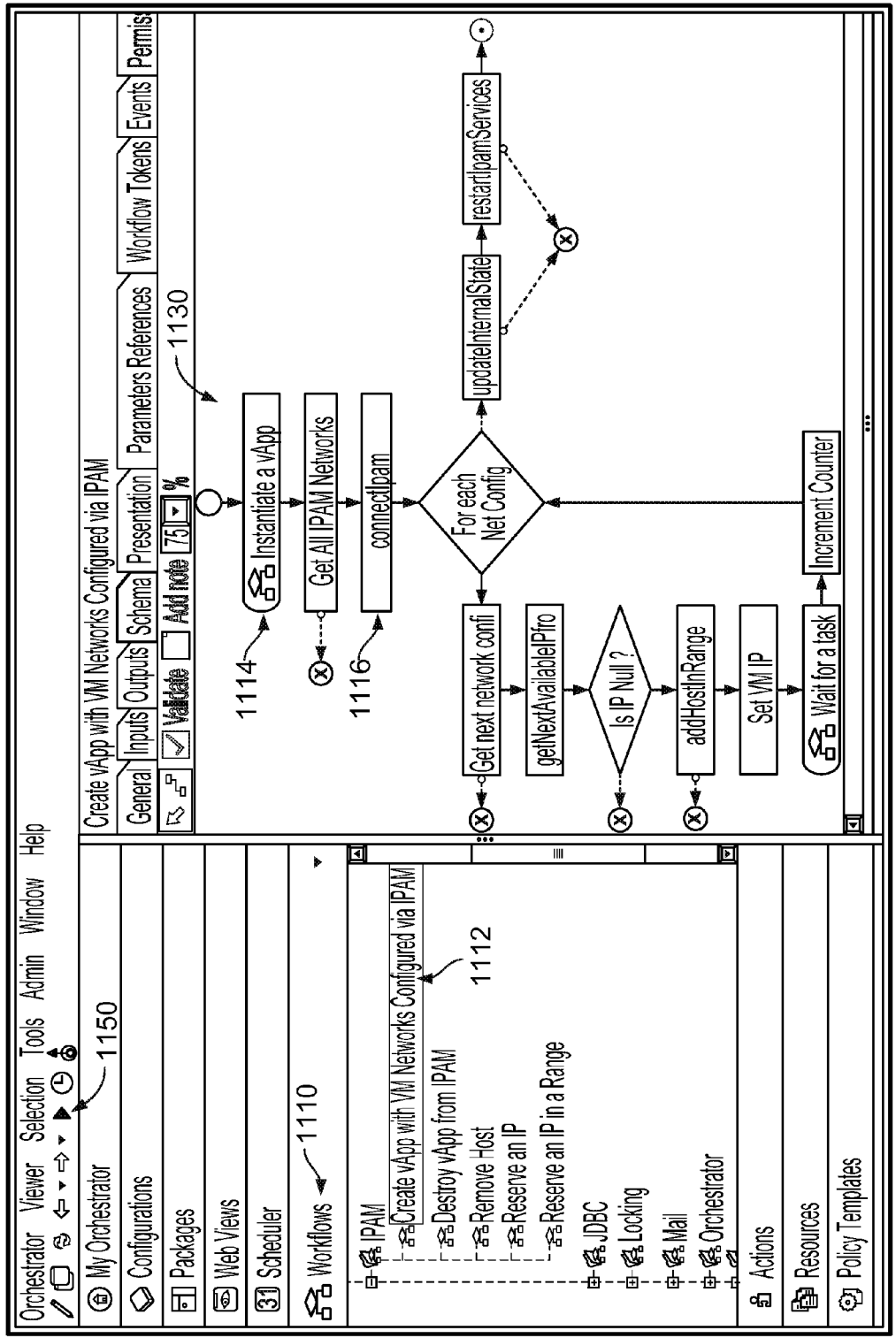
FIG. 11 is a diagram illustrating an example user interface to control and configure workflows to manage a virtual cloud environment.

FIG. 11 is a diagram illustrating an example user interface to control and configure workflows to manage a virtual cloud environment. In some embodiments, the user interface shown in FIG. 11 is an example of a user interface of global cloud manager interface application (e.g., application 250 of FIG. 2) that interfaces with a global cloud manager. In the example shown, sidebar section 1110 shows a list of available workflows. Window 1130 shows a graphical representation of a workflow selected from section 1110. Workflows listed section 1110 includes additional workflows added by an installed IPAM plug-in. Selected workflow 1112 named "Create vApp with VM networks configured via IPAM" has been provided by the IPAM plug-in. Window 1130 shows a workflow in a flowchart graphical representation. Actions that make up workflows are shown as blocks in the flowchart representation. The arrows connecting the blocks represent flow of actions in the workflow. For example, "Instantiate a vApp" action 1114 represents the task of creating a VMware® vApp. "connectIpam" Action 1116 represents the task of connecting to an IPAM appliance and authenticating a user. Various combinations of action blocks and flow arrows can be combined using the shown graphical interface to programmatically define a workflow. A user may initiate execution of a workflow by selecting a desired workflow in section 1110 and clicking play button 1150.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of processing infrastructure metadata information, comprising:
   collecting infrastructure metadata information about a virtual resource of a virtual cloud, wherein collecting the infrastructure metadata information includes using an Advanced Message Queuing Protocol message, collecting the infrastructure metadata information includes collecting information about the virtual resource, the virtual cloud includes a virtual switch, and the infrastructure metadata information includes information about a plurality of virtualization tiers that the virtual resource belong to, and collecting information about the virtual resource includes collecting from a hypervisor, information about a first tier of the plurality of virtualization tiers pertaining to a physical layer of the virtual resource, collecting information from an infrastructure manager that manages the hypervisor about a second tier of the plurality of virtualization tiers, the information about the second tier includes an identifier of the virtual switch that has been automatically discovered, and collecting information from a cloud manager that manages the infrastructure manager about a third tier of the plurality of virtualization tiers; and
   updating a storage of infrastructure metadata information using the collected information.

2. The method of claim 1, wherein the collected infrastructure metadata information includes information that identifies a location of the virtual resource in the virtual cloud.

3. The method of claim 1, wherein the virtual resource includes one or more of the following: a virtual machine, a virtual entity, a virtual device, a virtual network, a virtual switch, a virtual host adaptor, and a virtual appliance.

4. The method of claim 1, wherein the collected infrastructure metadata information includes one or more of the following: a fully qualified domain name, an Internet Protocol address, a Media Access Control address, an operating system metadata, a virtual data center metadata, an infrastructure manager metadata, a hypervisor metadata, a virtual entity metadata, a virtual cluster metadata, a virtual host metadata, a host server metadata, a virtual switch metadata, a virtual entity type metadata, an extensible attribute, a virtual resource container metadata, an organization metadata, a cloud metadata, a data center metadata, and an external network metadata.

5. The method of claim 1, wherein collecting the information includes receiving the collected information at an Internet Protocol Address Management appliance.

6. The method of claim 1, wherein collecting the information includes receiving a result from crawling the virtual cloud to discover the infrastructure metadata information about the virtual resource.

7. The method of claim 1, wherein collecting the information includes dynamically collecting the information due to a creation of the virtual resource in the virtual cloud.

8. The method of claim 1, wherein collecting the information includes receiving information from an agent in communication with a global cloud manager of the virtual cloud.

9. The method of claim 1, wherein at least a portion of the collected information is used to automatically provision an Internet Protocol address to the virtual resource.

10. The method of claim 1, wherein updating the storage includes updating a data record associated with the virtual resource with at least a portion of the collected information.

11. The method of claim 1, wherein the storage is included in a database managed by an Internet Protocol Address Management appliance.

12. The method of claim 1, wherein the storage includes a data record for each virtual machine in the virtual cloud.

13. The method of claim 1, wherein the virtual resource is to be removed from the virtual cloud and updating the storage includes removing from the storage, information associated with the virtual resource.

14. The method of claim 1, further comprising organizing the collected information in a hierarchical format to be displayed.

15. A system for processing infrastructure metadata information, comprising:
   a communication interface configured to receive collected infrastructure metadata information about a virtual resource of a virtual cloud, wherein the collected infrastructure metadata information was collected using an Advanced Message Queuing Protocol message, the collected infrastructure metadata information includes information about the virtual resource, the virtual cloud includes a virtual switch, and the infrastructure metadata information includes information about a plurality of virtualization tiers that the virtual resource belong to, and collecting information about the virtual resource includes collecting from a hypervisor, information about a first tier of the plurality of virtualization tiers pertaining to a physical layer of the virtual resource, collecting information from an infrastructure manager that manages the hypervisor about a second tier of the plurality of virtualization tiers, the information about the second tier includes an identifier of the virtual switch that has been automatically discovered, and collecting information from a cloud manager that manages the infrastructure manager about a third tier of the plurality of virtualization tiers; and
   a processor configured to update a storage of infrastructure metadata information using the collected information.

16. The system of claim 15, wherein the system is included in an appliance that manages allocation of Internet Protocol addresses.

17. The system of claim 15, wherein the collected infrastructure metadata information includes information that identifies a location of the virtual resource in the virtual cloud.

18. The system of claim 15, wherein the collected infrastructure metadata information includes one or more of the following: a fully qualified domain name, an Internet Protocol address, a Media Access Control address, an operating system metadata, a virtual data center metadata, an infrastructure manager metadata, a hypervisor metadata, a virtual entity metadata, a virtual cluster metadata, a virtual host metadata, a host server metadata, a virtual switch metadata, a virtual entity type metadata, an extensible attribute, a virtual resource container metadata, an organization metadata, a cloud metadata, a data center metadata, and an external network metadata.

19. A computer program product for processing infrastructure metadata information, the computer program product being embodied in a tangible non-transitory computer readable storage medium and comprising computer instructions for:
    collecting infrastructure metadata information about a virtual resource of a virtual cloud, wherein collecting the infrastructure metadata information includes using an Advanced Message Queuing Protocol message, collecting the infrastructure metadata information includes collecting information about the virtual resource, the virtual cloud includes a virtual switch, and the infrastructure metadata information includes information about a plurality of virtualization tiers that the virtual resource belong to, and collecting information about the virtual resource includes collecting from a hypervisor, information about a first tier of the plurality of virtualization tiers pertaining to a physical layer of the virtual resource, collecting information from an infrastructure manager that manages the hypervisor about a second tier of the plurality of virtualization tiers, the information about the second tier includes an identifier of the virtual switch that has been automatically discovered, and collecting information from a cloud manager that manages the infrastructure manager about a third tier of the plurality of virtualization tiers; and
    updating a storage of infrastructure metadata information using the collected information.

20. The computer program product of claim 19, wherein collecting the information includes receiving the collected information at an Internet Protocol Address Management appliance.

* * * * *